United States Patent Office 3,527,715
Patented Sept. 8, 1970

3,527,715
REGENERATION OF CHLORINE CONTAINING METALLIFEROUS-ALUMINA ISOMERIZATION CATALYSTS
Joseph P. Giannetti, Allison Park, Alfred M. Henke, Springdale, Howard G. McIlvried, Pittsburgh, and Raynor T. Sebulsky, Verona, Pa., assignors to Gulf Research & Development Company, Pittsburgh, Pa., a corporation of Delaware
No Drawing. Filed Aug. 2, 1966, Ser. No. 569,596
Int. Cl. B01j 11/80
U.S. Cl. 252—415                              3 Claims

ABSTRACT OF THE DISCLOSURE

A method for regenerating isomerization catalysts composed of alumina metalliferous hydrogenating components and chlorine after such catalyst has become deactivated by employment in an isomerization process. The method of regenerating the deactivated catalyst comprises contacting the spent catalyst with an oxygen-free gas at a temperature of from 600° to 1100° F. for a period of from one to twelve hours and thereafter subjecting the gas-contacted catalyst to a chlorination treatment.

Our invention relates to the regeneration of low temperature isomerization catalysts.

The low temperature conversion and particularly the isomerization of $C_4$ and higher paraffinic hydrocarbons can be effected employing techniques and catalysts well known in the art. Generally, the catalysts employed in such processes are comprised of a metalliferous hydrogenating component such as, for example, Group VI and Group VIII metals, particularly platinum and palladium, composited with inorganic oxide carriers such as, for example, the refractory metal oxides, particularly alumina. It is also known in the art to promote the activity of these catalysts by the addition of chlorine. It has previously been suggested in the art that this chlorine addition can be effected through the use of a Friedel-Crafts metal chloride, for example aluminum chloride, or by reacting the catalyst with a chlorinating agent such as, for example, a material having the general formula:

where X, when a monovalent radical, is selected from the group consisting of H, Cl, Br and SCl, where Y, when a monovalent radical, is selected from the group consisting of H, Cl, Br and SCl, and where X and Y when they together form a divalent radical, is selected from the class consisting of O and S.

In accordance with our invention, we have discovered a method for regenerating an isomerization catalyst comprising a metalliferous hydrogenating component composited with an alumina carrier which catalyst, at least in its fresh state, also contains an activating halogen. The method of our invention comprises contacting such a catalyst, which has become deactivated through employment in an isomerization process, with an oxygen-free gas at a temperature from about 600° to about 1100° F. for a period of time from about 1 to about 12 hours. Thereafter, the gas contacted catalyst is subjected to a halogenation treatment by contact with a halogenating agent under non-reducing conditions and at an elevated temperature.

The catalysts which are suitable for regeneration in accordance with our invention can comprise any of the well known low temperature isomerization catalysts which, in their fresh state, comprise a hydrogenating component on an alumina carrier and contain an activating halogen, usually chlorine. The hydrogenating component can be any of the well known Group VI or Group VIII metals, particularly platinum or palladium, and can be composited with the carrier by any of the techniques also well known in the art such as, for example, by impregnation. The activation of the fresh catalyst by the addition of chlorine thereto can also be accomplished by any of the techniques previously suggested by the art. Preferably, however, the chlorine activation of the catalyst has been accomplished by the chlorinating technique employing the particular type of chlorinating agents to be described below.

As mentioned above, in acordance with our regeneration method the isomerization catalyst which has become spent or deactivated through employment in an isomerization process is first contacted with an oxygen free gas at a temperature from about 600° to 1100° F. Generally, any gas or mixture of gases which will not undergo an undesirable reaction with the catalyst at the temperatures indicated, and which is also free of oxygen, can be employed in our invention. Illustrative of such gases are hydrogen, nitrogen, argon, neon and other inert gases either alone or in admixture. Flue gas from an inert gas generator can also be employed. We have found both hydrogen and nitrogen, and particularly nitrogen, to be quite suitable for employment in our invention.

Although temperatures throughout the entire range from about 600° to 1100° F. can be employed satisfactorily in the gas contacting step of our invention, we prefer to employ temperatures in the range from about 700° to 950° F. It should also be pointed out that the effects desired from the high temperature treatment of catalysts in the presence of the oxygen-free gas are a function of time and temperature and thus it will be seen that when employing the higher temperatures, shorter treatment periods can be employed, and conversely when employing the lower temperatures, longer treatment periods are required. Accordingly, when employing the preferred range of temperatures mentioned above, we have found that the length of treatment required will usually be in the range from about 2 to about 8 hours.

Broadly, the chlorinating agents preferred in the chlorination treatment of our invention can be described as compounds containing at least two chlorine atoms bound to a non-halogen atom, the residues of which, i.e., after reaction with the catalyst being regenerated usually by removal of at least the two chlorine atoms, must form volatile or volatilizable substances. In many of these chlorinating agents it will be found that the chlorine atoms are bound to the same non-halogen atom, such as, for example, 1,1,1-trichloroethane, while in other chlorinating agents the chlorine atoms are bound to different non-halogen atoms, such as, for example, sulfur monochloride. Illustrative of these chlorinating agents are carbon chlorides with at least a 2:1 chlorine to carbon atomic ratio such as trichloroacetylchloride

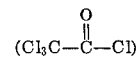

and materials having the generic formula $CCl_2XY$ where X and Y, when monovalent radicals are H, Cl, Br or SCl, and where X and Y, when they together form a divalent radical, are O or S. These chlorinating agents also include sulfur halides having the generic formula $S_nO_aCl_bY_c$ where Y is a halogen other than chlorine, n is 1 or 2, a is 0, 1, 2, 3 or 5, b is 2, 4 or 7, c is 0 or 1 and the sum of b and c is 2 to 8, such as thionyl chloride, sulfur monochloride, sulfur dichloride, sulfuryl chloride and sulfur trioxytetrachloride. Another type of these chlorinating agents are the phosphorous halides having the generic formula $PZ_aCl_bY_c$ where Z is oxygen or sulfur, Y is a halogen other than chlorine, $a$ is 0 or 1, $b$ is 2, 3, 4 or 5 and $c$ is 0, 1, 2 or 3, such as phosphorous pentachloride, phosphorous oxychloride and phosphorous thiochloride. A further illustration of the chlorinating agents preferred in the method of our invention is methyl chloroform.

It is believed that the chlorination treatment effected with these chlorinating agents can be described as one wherein at least two chlorine atoms react with two adjacent surface hydroxyl groups on the alumina with the elimination of water whereby two adjacent Al-Cl bonds are formed in place of the two hydroxyl groups. The remaining atom of oxygen is then removed by reaction with the residue of the chlorinating agent to form a volatile compound. Illustrative of this mechanism are the following equations wherein several suitable chlorinating agents are employed.

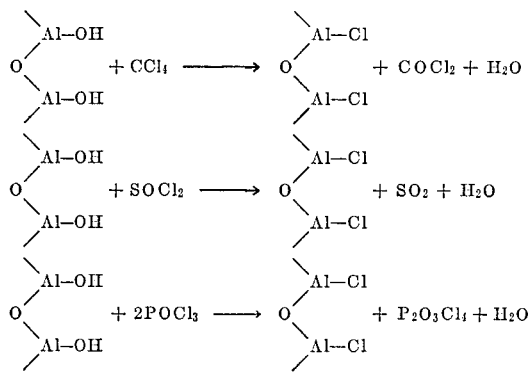

It must also be pointed out that multi-step chlorinating treatments can be employed in the regeneration technique of our invention. Thus, for example, the catalyst can be chlorinated employing the procedure which comprises pretreating the hydrogenating metal supported on the alumina base with hydrogen chloride at a temperature in the range from about 950° to 1250° F., activating the pretreated catalyst by contacting it with chlorinating agent, particularly one of the type described above, at a temperature in the range from about 200° to about 1200° F., preferably from about 325° to about 1100° F. and then further promoting the activity of the pretreated, activated catalyst by subjecting it to an after-treatment with hydrogen chloride at a temperature in the range from about 60° to about 900° F.

The reactivation process of our invention employing first, contact with an oxygen-free gas at an elevated temperature, and second, the employment of a particular type of chlorination treatment is effective to restore the spent catalyst at least to the activity level initially possessed by the fresh catalyst, and in many instances is effective to provide a regenerated catalyst having an activity greater than that of the fresh catalyst. The employment of the oxygen-free gas in the first step of our inventive regeneration procedure also advantageously provides an efficiency in the chlorination step inasmuch as it is known in the art that contacting of an isomerization catalyst containing chlorine with an oxygen containing gas at an elevated temperature is effective to remove substantial quantities of chlorine from the catalyst. Thus, if a spent catalyst with a reduced chlorine content compared to the fresh catalyst is contacted with oxygen at a high temperature, the result is a further reduction in the quantity of chlorine on the catalyst. Since activity of these isomerization catalysts in many instances is dependent upon the quantity of chlorine present, the removal of any chlorine from the catalyst, such as by oxygen treatment, thereby places a greater burden on the subsequent chlorination step.

It must also be pointed out that, in a typical commercial operation when it is desired to regenerate an isomerization catalyst, it is necessary first to purge hydrocarbons from the system, and this can conveniently be done by discontinuing charge of hydrocarbons while maintaining flow of the hydrogen stream. Although this is an effective and simple means of removing hydrocarbons from the system, oxygen can not be introduced into such a hydrogen containing reaction system since such would not only permit the formation of water, and thus the total destruction or deactivation of the catalyst, but hydrogen plus oxygen would give a violent reaction in certain instances and is, therefore, an explosive hazard. It becomes necessary, therefore, to employ a second purge of the reaction system employing an inert gas such as, for example, flue gas. Only then is the reaction system ready to receive oxygen. In contrast to this, the process of our invention provides a much simpler and more rapid reactivation procedure since all that is necessary is to insure contact of the spent catalyst with an oxygen-free gas at an elevated temperature. Thus, for example, all that need be done is to discontinue charge of the hydrocarbon feed to the reactor while maintaining flow of hydrogen to the system after which the temperature can be raised to the desired level. Even if it is desired to employ a gas other than hydrogen for the treatment, it is not necessary to effect a complete purge of hydrogen from the system before adding another gas. Thus, for example, nitrogen could be added at an increasing flow rate to the system, while the flow of hydrogen was being correspondingly diminished.

It must be pointed out that although it is essential to the operation of our invention and to obtain the advantage of our invention that no oxygen be present during the first step of gas contacting in accordance with our invention, it is permissible for oxygen to be present during the subsequent chlorination step of our invention under certain circumstances. If, for example, it is desired to employ a compound such as sulfur monochloride ($S_2Cl_2$) as the chlorinating agent, it is usually desirable to add a certain amount of extraneous oxygen along with the sulfur monochloride to insure formation of a volatile compound from the residue of the chlorinating agent. The particular mechanism involved can be illustrated by the following equation

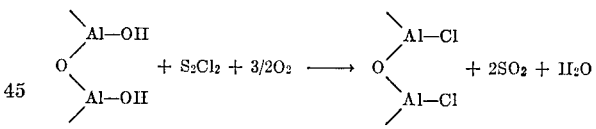

When this particular technique of adding extraneous oxygen along with the chlorinating agent is employed in our invention it is necessary to avoid extremely high temperatures in order to prevent removal of chlorine from the catalyst.

If desired, the addition of extraneous oxygen need not be practiced when employing a chlorinating agent such as sulfur monochloride, but then it usually becomes necessary to employ another method for removing the residue of the chlorinating agent, such as, for example, by the employment of a solvent for the residue or volatilizing the residue by another manner. In the case of the residue from sulfur monochloride the catalyst can be washed with carbon disulfide or the catalyst can be treated at a temperature sufficient to volatilize the sulfur.

In order to illustrate our invention in greater detail, reference is made to the following examples.

EXAMPLE I

In this example, a fresh catalyst is prepared starting with 126 grams of a reforming-type catalyst containing about 0.6 percent by weight platinum on an alumina support which has a surface area on calcining of 425 square meters per gram. This composite is then brought up to a temperature of 1050° F. At this temperature a gaseous mixture of hydrogen and hydrogen chloride (1.5 s.c.f. $H_2$/hr.–15 g. HCl/hr.) is passed over the catalyst for three hours. The catalyst is then purged with nitrogen and the temperature of the pretreated catalyst is reduced to 560° F. Thionyl chloride, in the total amount of 54 grams, is then passed over the catalyst during a period of 45 minutes.

The hydrogen-hydrogen chloride-pretreated, thionyl chloride-activated catalyst is then cooled to 400° F. and subjected to after-treatment with hydrogen chloride. This treatment is effected by passing 15 grams of hydrogen chloride per hour over the catalyst for three hours.

After having been cooled to room temperature, 126 grams of a catalyst of this type was charged to a reactor for use in n-butane isomerization. The reaction conditions employed for isomerization included a temperature of 350° F., a pressure of 500 p.s.i.g., a liquid hourly space velocity of 2, and a hydrogen to butane molar ratio of 0.32:1. Analysis of the effluent from the isomerization reaction when employing the fresh catalyst indicated a butane conversion of 60 percent by weight.

This catalyst was then deactivated by introducing water into the feed until analysis of reactor effluent indicated a butane conversion of zero. Charge of butane to the reaction was then discontinued and various portions of the catalyst were removed for analysis and treatment.

A sample comprising 80 grams of the deactivated catalyst was subjected to the reactivation treatment of our invention. This 80 gram sample was first charged to a glass reactor and the temperature of the catalyst was then brought to 700° F. Nitrogen was passed over the catalyst at a rate of 2.5 s.c.f. per hour for a period of one hour. The temperature was then increased to 950° F. over two and one-half hours, while maintaining the flow of nitrogen at the rate of 2.5 s.c.f. per hour. The temperature was then maintained at 950° F. for an additional hour, while maintaining the same flow of nitrogen.

After completing the high temperature gas contacting, the catalyst was then subjected to the same multi-step chlorination treatment originally applied to the fresh catalyst and described above. The rates and temperatures employed were the same as described above; however, the quantities of reagents were scaled down to correspond to the reduced quantity of catalyst being chlorinated. Thus, the total amount of thionyl chloride passed over the catalyst was about 34 grams, and similarly the rate and total amount of hydrogen chloride passed over the catalyst during the after-treatment were about 10 grams per hour, or a total of about 30 grams.

This regenerated catalyst was then employed in the isomerization of n-butane utilizing the same operating conditions employed initially. Analysis of the effluent from the isomerization reaction indicated a butane conversion of 60 percent by weight.

It will be seen, therefore, from the above data that the technique of our invention is effective to reactivate a spent isomerization catalyst. Particularly, it will be noted that a spent catalyst which has been deactivated to a zero conversion can be regenerated in accordance with our invention so as to provide a regenerated catalyst having an activity equivalent to that of a fresh catalyst. It will also be noted that the regeneration technique of our invention was accomplished employing oxygen free gases throughout thereby avoiding any diminution of the quantity of chlorine which may remain on a spent catalyst and without requiring a multiplicity of purges.

In the above example, only one purge of the reaction system was employed and that to remove hydrogen from the system before contacting the catalyst with thionyl chloride. The necessity for even this single purge can be eliminated by employing another gas, such as, for example, nitrogen as the carrier or diluent for the hydrogen chloride in the pretreating step. In this manner there is no hydrogen present in the system which might undergo a deleterious reaction with the thionyl chloride.

EXAMPLE II

In this example two other 126 gram samples of the 0.6 percent by weight platinum on alumina catalyst described in Example I are activated employing the same three step ($H_2$+HCl, $SOCl_2$ and HCl) technique also described in Example I. Again, employment of these catalysts for n-butane isomerization at a temperature of 350° F., a pressure of 500 p.s.i.g., a liquid hourly space velocity of 2 and a hydrogen to butane molar ratio of 0.32:1 provides a butane conversion of 60 percent by weight. These catalysts are then deactivated by introducing water into the feed until analysis of reactor effluent indicates a butane conversion of zero.

One of these catalysts is then subjected to regeneration in accordance with our invention employing the same technique described in Example I including contacting with nitrogen at temperatures over the range from 700° to 950° F. followed by the three step chlorination treatment employing thionyl chloride. The other of these catalysts is subjected only to the three step activation treatment without being contacted with an inert gas at high temperatures. Both of these catalysts are then tested for activity by employing them in two separate isomerization reactions employing the same feed stocks and operating conditions described above. Analysis of the effluents from these reactions indicates that a butane conversion of only about 50 percent by weight is obtained with the catalyst subjected to the chlorination treatment alone while a butane conversion of about 60 percent by weight is obtained with the catalyst regenerated in accordance with our invention.

EXAMPLE III

In this example, a 126 gram sample of the same 0.6 percent by weight platinum on alumina catalyst employed in Example I was initially activated by contacting the composite with 54 grams of thionyl chloride at a temperature of 560° F. This catalyst was then employed in the isomerization of n-butane under operating conditions including a temperature of 325° F., a pressure of 800 p.s.i.g., a liquid hourly space velocity of 1 and a hydrogen to butane molar ratio of 2.5:1. Analysis of effluent from the isomerization reaction indicated a butane conversion of 22 percent by weight.

This catalyst is then deactivated by introducing olefinic material into the feed until analysis of reactor effluent indicates a butane conversion of zero. Charge of butane to the reactor is then discontinued while the flow of hydrogen to the reactor is maintained. The temperature is then gradually increased to about 1050° F. over a period of several hours while introducing nitrogen in a gradually increasing flow rate so as to maintain a total overall gaseous flow rate at a constant value while diminishing the flow rate of hydrogen. Hydrogen chloride is then introduced so as to provide a 1:4 by volume gaseous mixture of hydrogen chloride and nitrogen. This mixture is passed over the catalyst for a period of about three hours. At the end of the three hour period, the temperature of the hydrogen chloride pretreated catalyst is reduced to about 560° F. Thionyl chloride in the total amount of 54 grams is then passed over the catalyst during a period of 45 minutes.

The hydrogen chloride-pretreated, thionyl chloride-activated catalyst is then cooled to 400° F., and the activated catalyst is subjected to after treatment with hydrogen chloride. This treatment is effected by passing a 4:1 by volume gaseous mixture of hydrogen and hydrogen chloride over the catalyst for three hours at the rate of 15 grams of hydrogen chloride per hour while maintaining the 400° F. temperature. The introduction of hydrogen chloride is then discontinued while the flow of hydrogen is maintained and the temperature is reduced to about 325° F. At this time, the charge of n-butane to the reactor is resumed. Analysis of the effluent from the isomerization reaction indicates a butane conversion of about 44 percent by weight.

From the above example it will be seen that when employing the preferred multi-step chlorination technique in our invention it is possible to provide a regenerated catalyst having a greater activity than possessed by a fresh catalyst which had been chlorinated employing a different technique.

EXAMPLE IV

In this example another chlorine promoted platinum on alumina catalyst was employed for the isomerization of hexane under operating conditions including a temperature of 250° F., a pressure of 1000 p.s.i.g., a weight hourly space velocity of 1 and a hydrogen to hexane molar ratio of 1.5. The conversion obtained employing this fresh catalyst was 80 percent by weight.

This catalyst is deactivated by introducing water into the feed stock so as to provide a zero conversion. At this time, the charge of hydrocarbon feed stock is discontinued while the flow of hydrogen is maintained. The temperature is gradually increased to a level above about 1000° F. over a period of several hours. During this same time, nitrogen is added at an increasing flow rate while simultaneously diminishing the flow rate of hydrogen until the hydrogen has been completely replaced by the nitrogen. The catalyst is then contacted with hydrogen chloride at a temperature above about 1000° F., for a period of several hours. The temperature of the catalyst is then reduced to the range of about 550° to 600° F. and contacted with a mixture of sulfur monochloride and oxygen in a mol ratio of about 1:4 for about three hours. Charge of the sulfur monochloride and oxygen is discontinued and the flow of nitrogen to the system is commenced while lowering the temperature to the range from about 350° to about 450° F. at which time hydrogen chloride is introduced into the system. This after treatment with hydrogen chloride is continued for about three hours after which the flow of hydrogen chloride is terminated and the original reaction temperature is reestablished. Charge of the hydrocarbon and hydrogen at initial operation conditions is recommenced. Analysis of the effluent from the isomerization reaction employing this reactivated catalyst indicates a conversion of about 80 percent by weight.

EXAMPLE V

In this example another chlorine promoted platinum on alumina catalyst is employed for the isomerization of butane under operating conditions including a temperature of 325° F., a pressure of 800 p.s.i.g., a liquid hourly space velocity of 1, and a hydrogen to butane mol ratio of 2.5. The conversion obtained employing this fresh catalyst is 44 percent by weight.

This catalyst is deactivated by introducing water into the feed stock so as to provide a zero conversion. At this time, the charge of butane is discontinued and various portions of the catalyst were removed for analysis and treatment.

A sample comprising 80 grams of the deactivated catalyst was charged to a glass reactor and the temperature of the catalyst was then brought to 700° F. A nitrogen flow was passed over the catalyst at a rate of 2.5 s.c.f. per hour for a period of one hour. The temperature was then increased to 950° F. over a period of two and one-half hours, while maintaining the nitrogen flow of 2.5 s.c.f. per hour. The temperature was then maintained at 950° F. for an additional hour, while maintaining the same flow of nitrogen.

After completing the high temperature gas contacting, the catalyst was then brought to 1050° F. and a gaseous mixture of hydrogen and hydrogen chloride (1.0 s.c.f. $H_2$/hr.-10 g. HCl/hr.) passed over the catalyst for three hours. The catalyst is then purged with nitrogen and the temperature reduced to 560° F. Sulfur monochloride, in the total amount of 34 grams is then passed over the catalyst during a period of three hours. During the addition, a nitrogen flow of 0.4 s.c.f. of nitrogen per hour is used. At the completion of the sulfur monochloride addition, the nitrogen flow is maintained at 500° F. for an additional one and one-half hours. The temperature of this composite is then increased to 800° F. over a period of one and one-half hours and held at 800° F. for one-half hour, all with the nitrogen flow. The temperature is then reduced to 400° F. and hydrogen chloride at a rate of 10 grams per hour is passed over the catalyst for three hours.

This regenerated catalyst was then employed in the isomerization of n-butane utilizing the same operating conditions employed initially. Analysis of the effluent from the isomerization reaction indicated a butane conversion of 44 percent by weight. From the above it will be seen that the spent isomerization catalyst has been completely reactivated.

EXAMPLE VI

In this example another 126 gram sample of a chlorine promoted 0.6 percent by weight platinum on alumina catalyst is tested for the conversion of n-butane by passing an n-butane feed stock to a reaction zone containing the catalyst at a temperature of about 325° F., a pressure of about 800 p.s.i.g. and a liquid hourly space velocity of about 1. Hydrogen is concurrently charged along with the n-butane in a molar ratio of about 2.5 moles of hydrogen per mole of n-butane. Analysis of the effluent product stream from the reaction zone indicates that about 43 percent by weight of the n-butane is converted to isobutane.

This catalyst is then deactivated by introducing an olefinic material into the feed until analysis of reactor effluent indicates a butane conversion of zero. Charge of n-butane to the reactor is then discontinued while the flow of hydrogen to the reactor is maintained. The temperature is then gradually increased to about 1050° F. over a period of several hours. Hydrogen chloride is then introduced into the reaction zone so as to subject the catalyst to treatment with hydrogen at a flow rate of 1.5 s.c.f. per hour and with 15 grams of hydrogen chloride per hour over a period of about three hours.

The temperature is then reduced to about 560° F. and 35 grams of carbon tetrachloride is passed over the catalyst during a period of about one hour with a nitrogen carrier gas.

The temperature is then further reduced to about 400° F. and hydrogen chloride at the rate of 15 grams per hour is passed over the catalyst during the period of about three hours.

The introduction of hydrogen chloride is then discontinued and the temperature is reduced to about 325° F. at which time the charge of n-butane together with hydrogen is recommended. The pressure in the reaction zone is again at 800 p.s.i.g. and a liquid hourly space velocity of 1 is attained. The rate of charge of hydrogen and n-butane is adjusted so as to again attain a ratio of 2.5 moles of hydrogen per mole of n-butane. Analysis of the product effluent from the reaction zone again indicates that about 43 percent by weight of the n-butane is converted to isobutane.

EXAMPLE VII

Another 126 gram sample of the 0.6 percent by weight platinum on alumina catalyst described in Example I is initially activated by contacting the catalyst composite with 43 grams of trichloroacetylchloride at a temperature of 800° F. Air at the rate of about 0.5 s.c.f. per hour is also added together with the chlorine compound. At the conclusion of the chlorine addition, the air flow is maintained for several hours at a temperature of 800° F. The activated catalyst is then cooled in nitrogen. Analysis of this catalyst indicates that it contains about 8 percent chlorine.

This fresh, activated catalyst is then employed for the isomerization of n-butane. The reaction conditions employed include a temperature of about 325° F., a pressure of about 800 p.s.i.g. and a liquid hourly space velocity of about 1. Hydrogen is concurrently employed with the n-butane in a molar ratio of about 2.5 moles of hydrogen per mole of n-butane. Analysis of the product effluent stream indicates that a conversion of n-butane to isobutane of about 20 percent by weight is obtained.

This catalyst is then deactivated by introducing water into the feed until analysis of reactor effluent indicates a butane conversion of zero. Charge of butane to the reactor is then discontinued and the deactivated catalyst is subjected to regeneration in accordance with our invention. The temperature of the spent catalyst is then increased to about 950° F. while maintaining a nitrogen flow at the rate of about 2.5 s.c.f. per hour for several hours.

The temperature of the catalyst is then decreased to about 800° F. and the gas contacted catalyst is contacted with 43 grams of trichloroacetylchloride in the presence of air flowing at the rate of about 0.5 s.c.f. per hour. After completion of the chlorination step the catalyst is again employed for the isomerization of n-butane under the conditions mentioned above. Again analysis of the effluent stream indicates a butane conversion of about 20 percent by weight.

EXAMPLE VIII

A 125 gram sample of the 0.6 percent by weight platinum on alumina catalyst described in Example I was subjected to initial activation by raising it to a temperature of 800° F. in a nitrogen atmosphere at atmospheric pressure. During a 75 minute period a phosphorousoxychloride stream containing a total quantity of about 45 grams of phosphorousoxychloride together with the nitrogen stream was passed over the platinum-alumina composite. Analysis of the activated catalyst indicated that it contained 10 percent by weight chlorine.

A 125 milliliter sample of this activated catalyst was placed in a stirred autoclave to which was charged 500 milliliters of n-hexane. The system was placed under a hydrogen pressure of 300 p.s.i.g. and the temperature was raised to 275° F. over a three hour period and was held at this temperature for an additional three hours at which time the reaction was terminated. Analysis of the product obtained indicated a conversion of 71 percent of the n-hexane charge.

This catalyst is then deactivated by contacting it with a water containing hexane feed until a zero conversion is obtained.

This deactivated catalyst is then contacted with nitrogen at a temperature of about 1050° F. for a period of several hours after which the temperature is decreased to about 800° F. The catalyst is then contacted with about 45 grams of phosphorousoxychloride in a nitrogen stream during a period of about 75 minutes. The temperature is then reduced to about 275° F. and n-hexane is charged to the reaction system while maintaining a hydrogen pressure of about 300 p.s.i.g. Again these conditions are maintained for about three hours at which time the reaction is terminated. Analysis of the product obtained indicates a conversion of about 70 percent of the n-hexane charge.

EXAMPLE IX

In this example a 122 gram sample of the same 0.6 percent by weight platinum on alumina catalyst mentioned in Example I was activated by contacting the catalyst with methylchloroform (1,1,1-trichloroethane) at a temperature of 950° F. for a period of about one hour in the presence of air flowing at the rate of 0.57 s.c.f. per hour. Analysis of this catalyst indicated a chlorine content of 2.2 percent by weight. This catalyst was then evaluated for hexane isomerization by contacting the fresh activated catalyst with 330 grams of n-hexane in an autoclave at 275° F. and a hydrogen pressure of 300 p.s.i.g. The reaction was terminated after four hours at the 275° F. temperature and analysis of the product indicated 17 percent hexane isomerization with 100 percent selectivity to $C_6$ isomers.

This catalyst is then deactivated by contacting it with a water containing hexane feed under the above operating conditions until a zero conversion is obtained.

The deactivated catalyst is then contacted with nitrogen at a temperature of about 1050° F. for several hours after which the temperature is decreased to about 900° F. and the catalyst is again contacted in the presence of the nitrogen with about 34 grams of methylchloroform for about one hour. After completion of this chlorination step a stream of air flowing at about 0.6 s.c.f. per hour is passed over the catalyst at a temperature of about 900° to 950° F. in order to assist in removing the residue of the chlorinating agent.

The temperature is then reduced to about 275° F. and the regenerated catalyst is again contacted with n-hexane at a hydrogen pressure of about 300 p.s.i.g. After about four hours at this temperature the reaction is terminated. Analysis of the product indicates about 20 percent hexane isomerization with the same degree of selectivity obtained with the fresh catalyst.

We claim:
1. A method for regenerating an isomerization catalyst which has become deactivated by employment in a low temperature isomerization process and which catalyst in the fresh state comprises a major proportion of alumina, a minor proportion of a metalliferous material having hydrogenating activity and chlorine, the chlorine having been added to the catalyst by chlorine activation with an activating agent selected from the group consisting of:
  (a) sulfur halides having the generic formula $S_nO_aCl_bY_c$ wherein Y is a halogen other than chlorine, $n$ is 1 or 2, $a$ is 0, 1, 2, 3, or 5, $b$ is 2, 4, or 7, $c$ is 0 or 1 and the sum of $b$ and $c$ is 2 to 8,
  (b) phosphorous halides having the generic formula $PZ_aCl_bY_c$ wherein Z is oxygen or sulfur, Y is a halogen other than chlorine, $a$ is 0 or 1, $b$ is 2, 3, 4 or 5 and $c$ is 0, 1, 2 or 3,
  (c) trichloroethane
  (d) trichloroacetylchloride
  (e) a carbon chloride having the generic formula $CCl_2XY$ wherein X, when a monovalent radical, is selected from the group consisting of H, Cl, Br and SCl, where Y, when a monovalent radical, is selected from the group consisting of H, Cl, Br and SCl, and where X and Y, when they together form a divalent radical, is selected from the group consisting of O and S, and
  (f) Friedel-Crafts metal chlorides,
which method comprises:
  (1) contacting the deactivated catalyst at a temperature from about 600° to about 1100° F. for a period of time from about one to about twelve hours with an inert, oxygen-free gas selected from the group consisting of hydrogen, nitrogen, argon, neon and flue gas and
  (2) thereafter subjecting the gas-contacted catalyst to a chlorination treatment by contacting the catalyst under non-reducing conditions and at an elevated temperature with a chlorinating agent selected from the group consisting of:
    (a) sulfur halides having the generic formula $S_nO_aCl_bY_c$ wherein Y is a halogen other than chlorine, $n$ is 1 or 2, $a$ is 0, 1, 2, 3 or 5, $b$ is 2, 4 or 7, $c$ is 0 or 1 and the sum of $b$ and $c$ is 2 to 8, and
    (b) phosphorous halides having the generic formula $PZ_aCl_bY_c$ wherein Z is oxygen or sulfur, Y is a halogen other than chlorine, $a$ is 0 or 1, $b$ is 2, 3, 4 or 5 and $c$ is 0, 1, 2 or 3
  the contacting being conducted at a temperature in the range from about 325° to about 1100° F.
2. The method of claim 1 wherein the metalliferous material is platinum.
3. The method of claim 1 wherein the chlorination treatment comprises pretreating the said inert oxygen free gas—contacted catalyst with hydrogen chloride at a temperature in the range from about 950° to about 1250° F., activating the pretreated catalyst by contacting it with said $Sn_aCl_bY_c$ and $PZ_aCl_bY_c$ under said non-reducing conditions and at a temperature in the range from about 200° to about 1200° F., and then further promoting the pretreated, activated catalyst by subjecting it to an after treament with hydrogen chloride at a temperature in the range from about 60° to about 900° F.

References Cited

UNITED STATES PATENTS

| | | | |
|---|---|---|---|
| 3,280,213 | 10/1966 | Mullen et al. | 252—411 |
| 3,389,191 | 6/1968 | Estes | 260—683.74 |
| 3,419,503 | 12/1968 | Giannetti et al. | 252—411 |
| 3,440,178 | 4/1969 | Lawrance et al. | 252—415 |
| 3,222,271 | 12/1967 | McClellan | 208—110 |
| 2,977,322 | 3/1961 | Varvel | 252—411 |
| 3,247,128 | 3/1966 | White et al. | 252—415 |
| 3,016,354 | 1/1962 | Hindin | 252—413 |

DANIEL E. WYMAN, Primary Examiner

P. E. KONOPKA, Assistant Examiner

U.S. Cl. X.R.

252—411, 441, 442; 260—683.68

PO-1050
(5/69)

UNITED STATES PATENT OFFICE
CERTIFICATE OF CORRECTION

Patent No. 3,527,715         Dated September 8, 1970

Inventor(s) J. P. Giannetti, A. M. Henke, H. G. McIlvried and
R. T. Sebulsky

It is certified that error appears in the above-identified patent and that said Letters Patent are hereby corrected as shown below:

Column 3, line 41, the --a-- has been omitted between "with" and "chlorinating".

Column 4, line 44, before the arrow "$3/2O_2$" should be --$3/2\ O_2$--.

Column 8, line 50, "recommended" should be --recommenced--.

Column 11, line 7, "treament" should be --treatment--.

SIGNED AND
SEALED
NOV 10 1970

(SEAL)
Attest:

Edward M. Fletcher, Jr.
Attesting Officer

WILLIAM E. SCHUYLER, JR.
Commissioner of Patents